(12) United States Patent
Wolfson et al.

(10) Patent No.: US 10,705,877 B2
(45) Date of Patent: Jul. 7, 2020

(54) WORKLOAD AUTOMATION AND DATA LINEAGE ANALYSIS

(71) Applicant: Ab Initio Technology LLC, Lexington, MA (US)

(72) Inventors: Harry Michael Wolfson, Arlington, MA (US); Joel Gould, Arlington, MA (US); Anthony Yeracaris, Newton, MA (US); Tim Wakeling, Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 365 days.

(21) Appl. No.: 14/470,501

(22) Filed: Aug. 27, 2014

(65) Prior Publication Data
US 2015/0347193 A1    Dec. 3, 2015

Related U.S. Application Data

(60) Provisional application No. 62/004,406, filed on May 29, 2014.

(51) Int. Cl.
*G06F 9/50* (2006.01)

(52) U.S. Cl.
CPC .................................. *G06F 9/5038* (2013.01)

(58) Field of Classification Search
None
See application file for complete search history.

(56) References Cited

U.S. PATENT DOCUMENTS

| 8,856,291 B2 * | 10/2014 | Bartlett | G06Q 10/0633 |
| | | | 705/301 |
| 2005/0071842 A1 * | 3/2005 | Shastry | G06F 9/5038 |
| | | | 718/100 |

(Continued)

FOREIGN PATENT DOCUMENTS

| JP | H06-083598 | 10/1995 |
| JP | 2000-066931 | 3/2000 |

(Continued)

OTHER PUBLICATIONS

International Search Report and Written Opinion issued in PCT/US2015/032193, dated Aug. 11, 2015 (10 pages).

(Continued)

*Primary Examiner* — Lewis A Bullock, Jr.
*Assistant Examiner* — Bruce S Ashley
(74) *Attorney, Agent, or Firm* — Fish & Richardson P.C.

(57) ABSTRACT

Methods, systems, and apparatus, including computer programs encoded on computer storage media, for workload automation and job scheduling information. One of the methods includes obtaining job dependency information, the job dependency information specifying an order of execution of a plurality of jobs. The method also includes obtaining data lineage information that identifies dependency relationships between data stores and transformation, wherein at least one transformation accepts data from a first data store and produces data for a second data store. The method also includes creating links between the job dependency information and the data lineage information. The method also includes determining an impact of a change in a planned execution of an application of the plurality of applications based on the job dependency information, the created links, and the data lineage information.

33 Claims, 6 Drawing Sheets

(56) References Cited

U.S. PATENT DOCUMENTS

| | | | |
|---|---|---|---|
| 2006/0010425 A1* | 1/2006 | Willadsen | G06F 8/71 717/120 |
| 2009/0241117 A1 | 9/2009 | Dasgupta et al. | |
| 2013/0212234 A1 | 8/2013 | Bartlett et al. | |
| 2014/0019370 A1* | 1/2014 | Chandra | G06Q 10/06313 705/301 |
| 2014/0279838 A1* | 9/2014 | Tsirogiannis | G06F 17/30292 707/603 |
| 2015/0309769 A1* | 10/2015 | Greene | G06Q 10/06 717/104 |

FOREIGN PATENT DOCUMENTS

| | | |
|---|---|---|
| JP | 2001-022695 | 1/2001 |
| JP | 2002-342317 | 11/2002 |
| JP | 2006-120021 | 5/2006 |
| JP | 2006-268509 | 10/2006 |
| JP | 2008-507008 | 3/2008 |
| JP | 2009-163566 | 7/2009 |
| JP | 2009-268103 | 11/2009 |

OTHER PUBLICATIONS

International Preliminary Report on Patentability issued in PCT/US2015/032193, dated Nov. 29, 2016 (8 pages).
Office Action (English Translation) issued in Japanese Application No. 2016-567355, dated Feb. 1, 2019, 21 pages.
JP Decision to Grant in Japanese Appln. No. 2016-567355, dated Jan. 26, 2020, 2 pages (Machine translation).
Office action issued in Japanese Application No. 2016-567355, dated Feb. 1, 2019.

* cited by examiner

WORKLOAD AUTOMATION AND DATA LINEAGE ANALYSIS

CROSS-REFERENCE TO RELATED APPLICATIONS

This application claims priority to U.S. Provisional Application Ser. No. 62/004,406, filed on May 29, 2014, entitled "WORKLOAD AUTOMATION AND DATA LINEAGE ANALYSIS," the entire contents of which are hereby incorporated by reference.

BACKGROUND

Workload automation generally refers to the process of setting up jobs so they can be run to completion without human interaction. All input parameters are predefined through scripts, command line arguments, workflow automation systems, control files, or job control languages. Jobs are scheduled based on available processing resources and predefined dependencies.

Data lineage describes a data's origins and where it moves and how it changes over time. This term can also describe what happens to data as it goes through diverse processes. Data lineage can help with efforts to analyze how information is used and to track key bits of information that serve a particular purpose.

SUMMARY

In a general aspect 1, a method includes the action of obtaining job dependency information, the job dependency information specifying an order of execution of a plurality of jobs. The method also includes the action of obtaining data lineage information that identifies dependency relationships between data stores and transformation, wherein at least one transformation accepts data from a first data store and produces data for a second data store. The method also includes the action of creating links between the job dependency information and the data lineage information. The method also includes the action of determining an impact of a change in a planned execution of an application of the plurality of applications based on the job dependency information, the created links, and the data lineage information.

Other embodiments of this aspect include corresponding computer systems, apparatus, and computer programs recorded on one or more computer storage devices, each configured to perform the action of the methods. A system of one or more computers can be configured to perform particular actions by virtue of having software, firmware, hardware, or a combination of them installed on the system that in operation causes the system to perform the actions. One or more computer programs can be configured to perform particular actions by virtue of including instructions that, when executed by data processing apparatus, cause the apparatus to perform the actions.

The methods include an aspect 2 according to aspect 1, where obtaining job dependency information may include obtaining the scheduling information from a work load repository associated with a workload automation system, transforming the scheduling information, and storing the scheduling information in a data store, the data store storing the data lineage. The methods include an aspect 3 according to aspects 1 or 2, wherein creating links includes identifying data sources referenced by the data lineage information and the job dependency information. The methods include an aspect 4 according to aspects 1, 2, or 3, wherein identifying the data sources includes identifying a data source referenced by the same name in the data lineage information and the job dependency information. The methods include an aspect 5 according to aspects 1, 2, 3, or 4, wherein identifying the data source includes identifying a data source using a uniform resource locator. The methods include an aspect 6 according to aspects 1, 2, 3, 4, or 5, wherein identifying the data sources includes identifying a relational database table using a database, table space, and a table name. The methods include an aspect 7 according to aspects 1, 2, 3, 4, 5, or 6, wherein creating links includes identifying executable programs referenced by the job dependency information and the data lineage information. The methods include an aspect 8 according to aspects 1, 2, 3, 4, 5, 6, or 7, wherein identifying the executable programs includes identifying an executable program based at least in part on parameters provided to the executable program. The methods include an aspect 9 according to aspects 1, 2, 3, 4, 5, 6, 7, or 8, wherein identifying the executable programs includes identifying an executable program based on the location of the executable program on a persistent data store. The methods include an aspect 10 according to aspects 1, 2, 3, 4, 5, 6, 7, 8, or 9, wherein determining the impact includes receiving a query the query identifying job scheduling data, identifying a link between the job scheduling data and data lineage information, and identifying an impact to the data lineage information based on the scheduling data.

Particular embodiments of the subject matter described in this specification can be implemented so as to realize one or more of the following advantages. A holistic view of the data processing system can be examined. Data lineage information that describes data dependencies can be combined with workflow automation information that describes scheduling dependencies. The impact of a change in either the data lineage or the job scheduling information can be determined. This may help the developer or administrator of technical processes to monitor and adjust workflows in a more efficient and less disruptive manner. Overall, process failures, resource consumption, and data processing duration can thereby each be reduced.

DESCRIPTION

Job dependency information and data lineage information can be combined to provide a holistic view of the state of the enterprise. Traditionally, job dependency information and data lineage information is fragmented across different information systems and databases. Job dependency information describes an order that is established between the execution of different jobs or tasks. Data lineage information describes how data sources and sinks are related across the enterprise. A user may wish to answer questions; such as if a particular job is going to be late or which reports or data sinks are going to be affected. The system described herein integrates these disparate data sources.

Job dependency information may be obtained from workload automation or job scheduling programs. Workload automation or job scheduling programs coordinate varied sets of workload types with complex dependencies. In general, job dependency information defines the order in which different tasks are to be executed. Application scheduling typically does not take data dependency into account; it is not, per se, data aware. Application scheduling merely dictates an order in which different tasks may execute. This ordering may be based on data dependency, but may also be based on resource allocation, total execution time, and optimized for other efficiencies. The tasks in a workload automation system may include data flow graphs, java programs, file transfer commands, business suite software integration, web service access, messaging, or any other executable process. A user may wish to determine the impact of a change to the schedule if, for example, a job is late. Workload automation systems are limited in their capacity to view details that are defined within the system.

In contrast, data lineage information identifies the order in which data is processed by the system. In general data lineage information describes a data life cycle that includes the data's origins and where the data moves or how it is transformed during the data processing applications. Data lineage information describes what happens to data as it is transformed by diverse processes. In general, analysis of data lineage information is used to identify how information is used and to track key pieces of information that serve a particular purpose. By integrating job dependency information into a data lineage repository a more robust view of a processes and data can be developed.

By integrating job dependency information into a data lineage repository, a more robust view of a processes and data can be developed.

Job dependency information can be extracted from a workload automation tool and data lineage information can be extracted from a data lineage tool. The information can be combined together and stored in a common repository for subsequent access.

Figure 1:
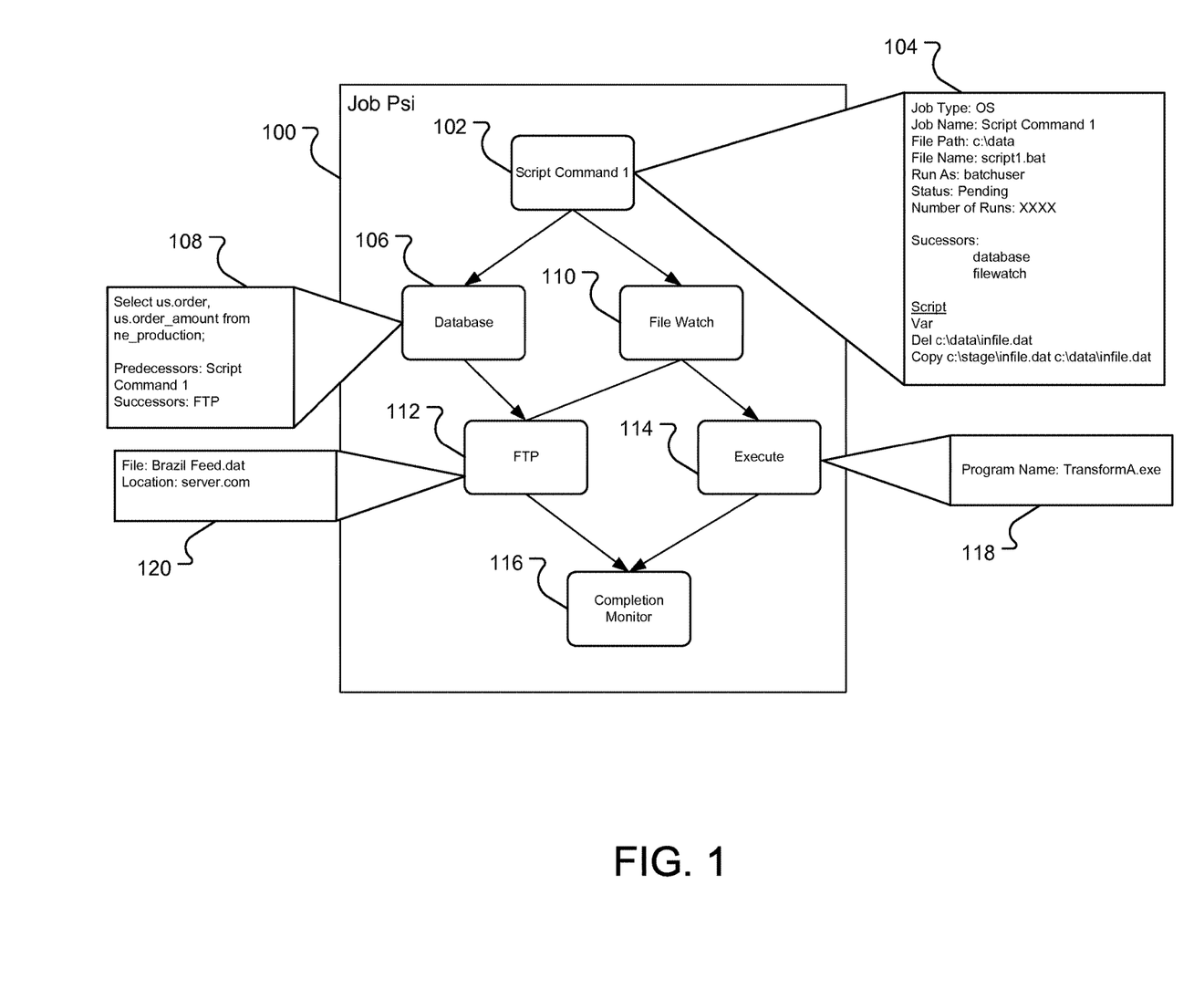
FIG. 1 is an exemplary scheduling diagram.

FIG. 1 is an exemplary scheduling diagram 100 for job "Psi." The scheduling diagram 100 is an example of a scheduling operation in a workload automation system. The scheduling diagram illustrates the job dependencies between the jobs. In most implementations, more complex diagrams with larger interrelationships between components are present. The current scheduling diagram 100 is used for exemplary purposes. Jobs are defined in a hierarchical order with predecessor jobs being required to complete before successor jobs can begin. In this diagram, jobs are connected by directed arrows. The arrows point from predecessor jobs to successor jobs. For example, the "Script Command 1" job 102 must complete before the "Database" job 106 or the "File Watch" job 110 can begin. Similarly, the "Database" job 106 and the "File Watch" job 110 must complete before the "FTP" job 112 may begin. The "Execute" job 114 may begin after the "File Watch" job 110 completes. Finally, the "Completion Monitor" job 116 can execute only after the "FTP" job 112 and the "Execute" job 114 complete.

The workload automation system collects information about the different jobs. For example, the "Script Command 1" job 102 has attributes 104 that define and describe the job. In this example, the attributes 104 include a job type, indicating the kind of job to be executed; job name, providing a name of the job; file path, defining the location of the script; file name, indicating the name of the script to be executed; run as, indicating the name of the user who should execute the script; status, indicating the current state of the job (for example pending, executing, completed, failed); successors, indicating jobs that can only execute after the current job is completed; and script, which defines the steps to be executed.

Other types of jobs may include different attributes. For example, the "Database" job 106 has attributes 108. These attributes include, but are not limited to, a SQL command (here "select us.order, us.order_amount from ne_production"); a list of predecessor jobs (here Script Command 1); and a list of successor jobs (here FTP).

Similarly the "Execute" job 114 may include a parameter 118 that identifies the name of the program to be executed for example "TransformA.exe." The "FTP" job 112 may include parameters 120 that identify the file and destination of the file transfer operation. For example, the parameters 120 identify that the Brazil Feed.dat file is to be transferred to server.com. The parameters identified herein are exemplary only. Other parameters may be defined and included by the job scheduling information.

The workload automation system may schedule job Psi with respect to other jobs, not shown. For example, job Psi may be scheduled to take place after job Zeta (or some other job, not shown). A workload automation system may determine the schedule between jobs based on resource management, reporting dependencies, available time, priority, or other constraints.

Figure 2:
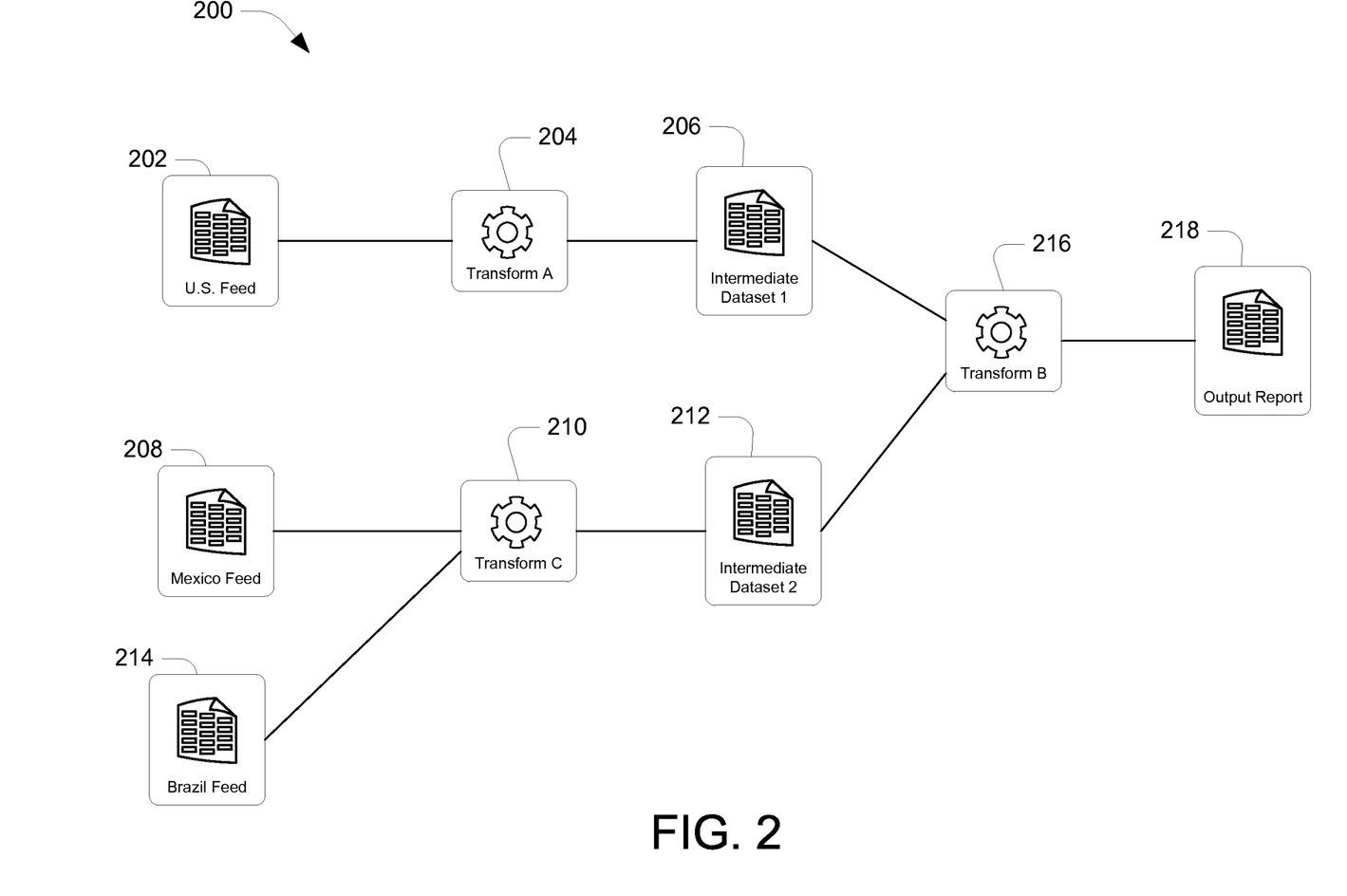
FIG. 2 is an exemplary data lineage diagram.

FIG. 2 is an exemplary data lineage diagram 200. Data lineage is generally defined as a data life cycle that includes the data's origins and where it moves and how it is transformed and processed. This term can also describe what happens to data as it goes through diverse processes. Data lineage can help with efforts to analyze how information is used and to track key bits of information that serve a particular purpose. In general, a data lineage diagram is a diagram that illustrates relationships between data sources, data sinks, and transforms. Each transform can include one or more data sources (e.g., input data) and produces data for one or more data sinks (e.g., output data). Each data source, data sink, and transform in the data lineage information will be collectively referred to herein as data lineage elements.

In this example, a data source "U.S. Feed" 202 provides data to a "Transform A" 204 transform. The Transform A 204 performs operations on the data provided by the "U.S. Feed" 202 and stores the result in the "Intermediate Dataset 1" 206 data store. Data sources "Mexico Feed" 208 and "Brazil Feed" 214 provide data to a "Transform C" 210 transform. The "Transform C" 210 transform performs operations on the data provided by the "Mexico Feed" 208 and the "Brazil Feed" 214 and stores the result in an "Intermediate Dataset 2" 212 data store. The data sources may be, for example, flat files, relational databases, object databases, or any other mechanism for storing data in a computer system. For example, the "Brazil Feed" 214 may be a file such as "Brazil Feed.dat". Transforms may be an executable program that can manipulate data. For example, a java program executed within a virtual machine, an executable, a data flow graph, etc. For example, the 'Transform A" 204 transform may be an executable named "TransformA.exe."

The "Intermediate Dataset 1" 206 data store and the "Intermediate Dataset 2" 212 data store provide data to the "Transform B" 216 transform. The "Transform B" 216 transform uses the data provided from the "Intermediate Dataset 1" 206 and the "Intermediate dataset 2" 212 stores the result in "Output Report" 218 data store.

Information stored in the data lineage can identify how different pieces of data affect other pieces of data. For example, the "U.S. Feed" data source may include orders and an amount per order. "Transform A" 204 may aggregate the data based on region; for example, by orders placed in New England, the Atlantic States, the South, The Mid-West, the Plains States, etc. The data lineage information could identify that the amount field from the "U.S. Feed" 202 is aggregated into a "Regional Total" field in the "Intermediate Dataset 1" 206.

There is some information that can only be derived by combining scheduling data with data lineage data. For example, if the "database job" 106 of FIG. 1 generates the "U.S. Feed" 202 of FIG. 2, then if the job 106 is late or fails to execute, then the output report 218 will be late or incorrect. Without viewing both data lineage information and the job scheduling information these relationships cannot be derived. Further the relationships can become more complex, because, referring to the above example, if "Job Zeta" (described above as preceding job Psi) is late, then the output report 218 may be late or incorrect.

Figure 3:
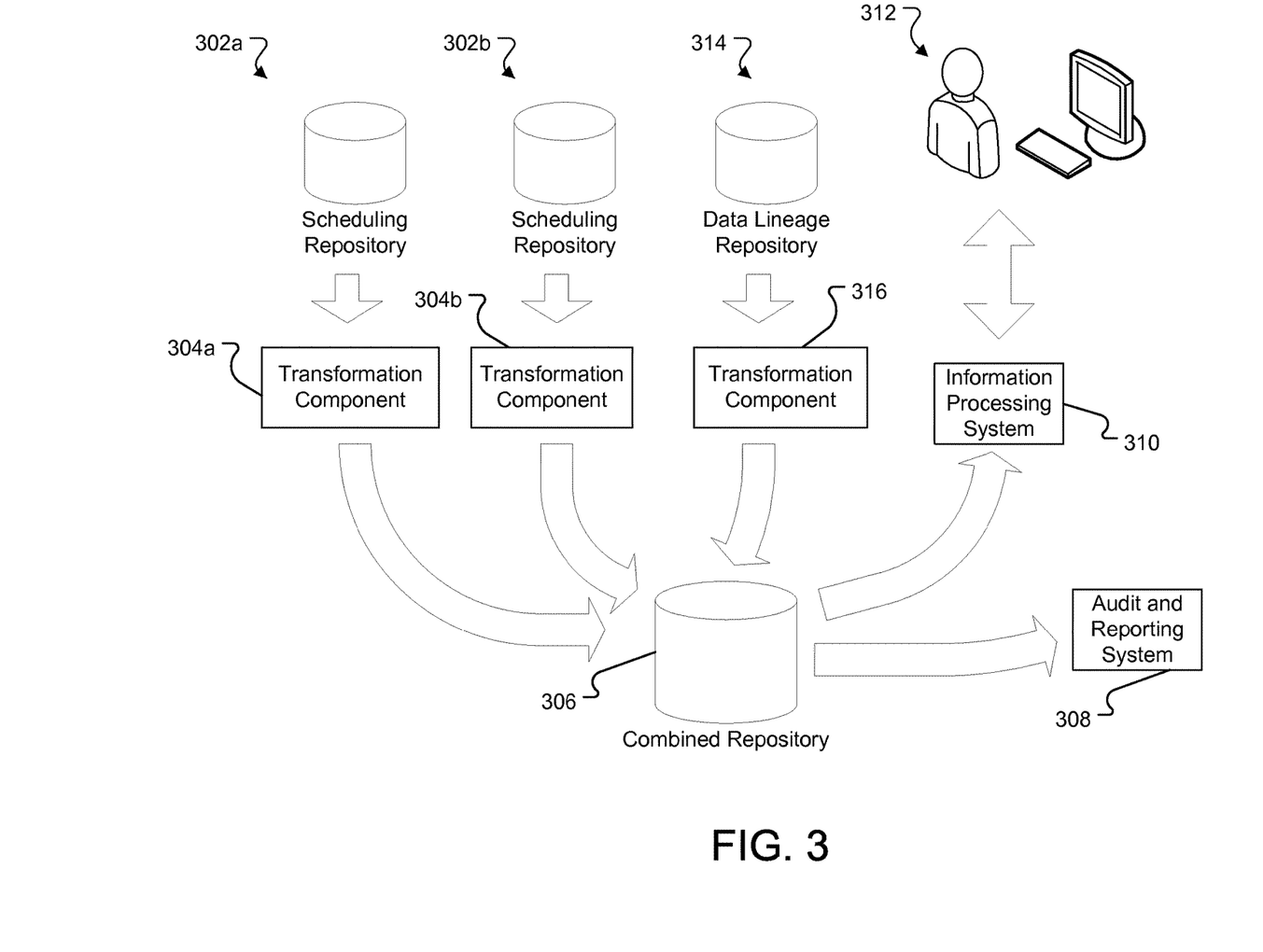
FIG. 3 is an exemplary system for integrating scheduling and data lineage information.

FIG. 3 is an exemplary system for integrating scheduling and data lineage information. Data from scheduling repositories 302a-b can be imported into a data lineage repository 306. The scheduling repositories 302a-b can be data repositories associated with workload automation systems, for example CONTROL-M, TIVOLI, TWS AUTOSYS, CA-7, etc. Data for each of the workload automation systems may be stored in a different format. Transformation components 304a-b can be used to transform the data stored in the Scheduling Repositories 302a-b into a common data format for storage in the combined repository 306. In some implementations, the transformation components may be, for example, dataflow graphs executing in a dataflow graph computational environment.

Data from data lineage repository 314 can also be stored in the combined repository. The data lineage information may be transformed by transformation component 316 before it is inserted into the repository. For example, the data types of the data may be converted from one type to another in order to conform to an expected data format of the repository. Additionally, the data structure may be altered, including, for example, simplifying the data lineage data structure, in order to efficiently integrate the data with the job scheduling information.

Job scheduling information can be collected and integrated into the combined repository. The job scheduling information can be modified into a format acceptable to the combined repository. For example, the format of particular fields of data may be changed. Relationships between different data objects may be altered into functionally identical or different forms. Integrating the job scheduling information can include identifying old or out of date information from previous loads of the workload scheduling data and overwriting or archiving it. Job dependency information and data lineage information is combined and linked together. The job dependency information may be linked to data lineage information based on attributes or parameters associated with the information. For example, a job and a data lineage element may reference the same executable (e.g., "TransformA.exe" as described above). The executable can be identified based on a fully qualified identifier. The fully qualified identifier may include a complete path, that is, the computer and location on persistent storage, such as a hard drive, may be identified. The fully qualified identifier may include any parameters that are provided to the executable. Similarly, a job and the data lineage element may reference the same data store. For example, in the figures above, the FTP job 112 of FIG. 1 and the Brazil Feed data source 214 reference the "Brazil Feed.dat" file. The data sources may be identified based on a fully qualified identifier. For example, the fully qualified identifier may be a complete path or uniform resource locator (URL) that identifies a flat file or information that identifies a server, database, table space, and table name in a relational database. The process can create a link between the job dependency information and the data lineage information when these or other common elements are identified.

In some implementations, the job scheduling information can be integrated into the combined repository 306 at regular intervals (e.g., weekly, daily, hourly, etc.). In some implementations, changes to the job scheduling information may trigger an integration process that integrates the information in near real time. For example, a database trigger may start an integration process when a change is detected. Alternatively, a callback mechanism in the job scheduling system may cause the integration process to start.

The combined repository 306 preferably is a scalable object-oriented database system designed to support the development and execution of graph-based applications and the interchange of metadata between the graph-based applications and other systems (e.g., other operating systems). The combined repository 306 is a storage system for all kinds of metadata, including documentation, record formats (e.g., fields and data types of records in a table), transform functions, graphs, jobs, and monitoring information.

The combined repository 306 can also store data objects that represent actual data to be processed by a computing system.

The combination of data lineage information and job dependency information stored in the combined repository 306 can be used to generate reports and information not otherwise available. Combining these two sources of data together enables a holistic view of the jobs not otherwise available. For example, the combination of data can be used to provide an answer to the question "if a job is late what does that mean for any given data set?" The job may not directly affect dataset 1, but may indirectly affect it because of scheduling directives in the workload automation systems.

An auditing and reporting system 308 can raise alerts when particular datasets are going to be affected. For example, a business may wish to raise an alert when a particular data set is going to be inaccurate.

An information processing system 310 can present a user 312 with a graphical user interface and can allow a user to drill down and view the particulars of the scheduling information and/or the data lineage, including navigating between the job scheduling information and the data lineage information based on the links described above.

Figure 4:
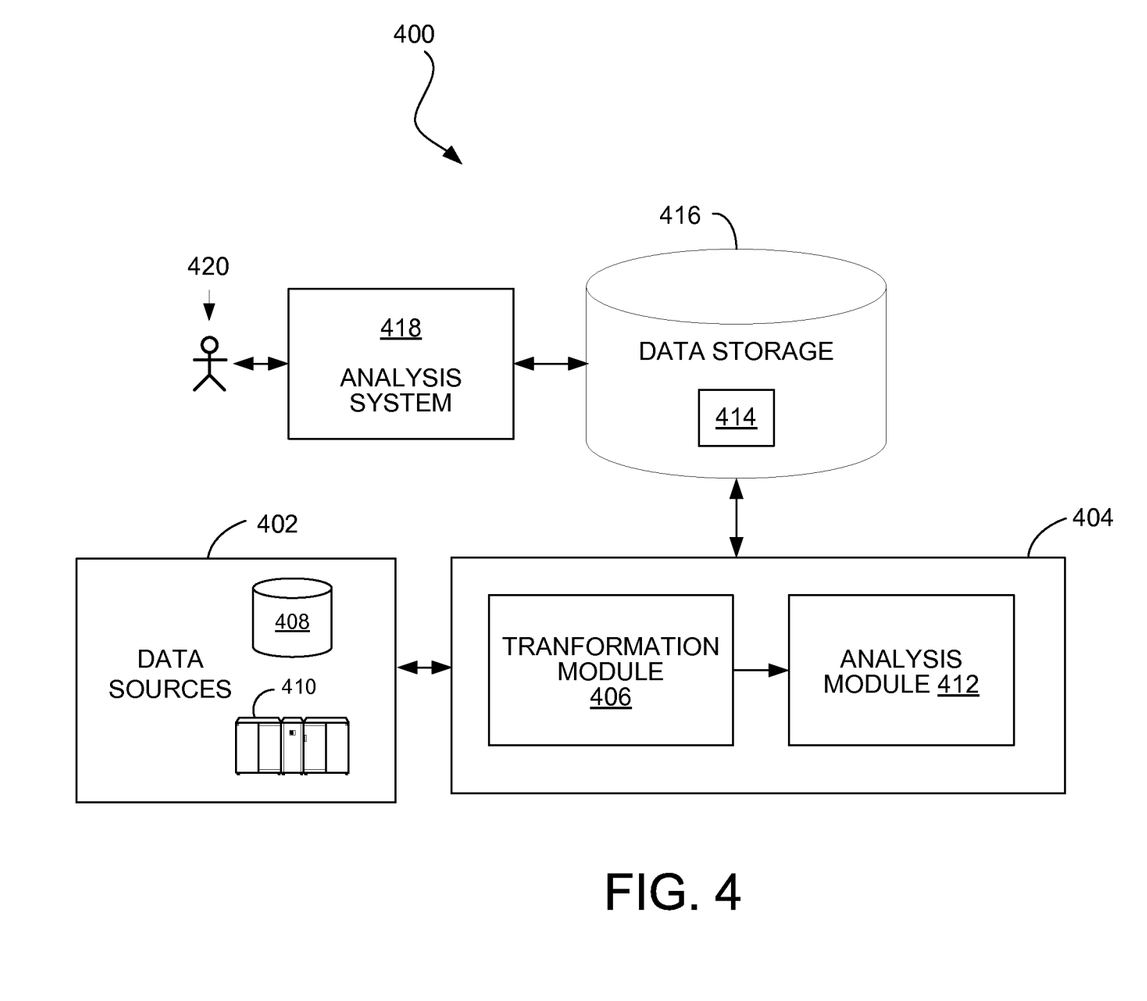
FIG. 4 shows an example of a data processing system in which the data analysis techniques can be used.

FIG. 4 shows an example of a data processing system 400 in which the data analysis techniques can be used. The system 400 includes a data source 402 that may include one or more sources of data, such as storage devices or connections to online data streams, including, for example, data repositories of workload automation system. Each data store may store or provide data in any of a variety of formats (e.g., database tables, spreadsheet files, flat text files, or a native format used by a mainframe). An execution environment 404 includes a transformation module 406 and an analysis module 412. The execution environment 404 may be hosted, for example, on one or more general-purpose computers under the control of a suitable operating system, such as a version of the UNIX operating system. For example, the execution environment 404 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems), or remote, or remotely distributed (e.g., multiple processors coupled via a local area network (LAN) and/or wide-area network (WAN)), or any combination thereof.

The transformation module 406 reads data from the data sources 402, transforms the data into a canonical format and stores the information in data storage 416. Storage devices providing the data source 402 may be local to the execution environment 404 (for example, being stored on a storage medium connected to a computer hosting the execution environment 404 (e.g., hard drive 408)), or may be remote to the execution environment 404 (for example, being hosted on a remote system (e.g., mainframe 410) in communication with a computer hosting the execution environment 404, over a remote connection (e.g., provided by a cloud computing infrastructure)).

The analysis module 412 uses the stored information generated by the transformation module 406 combined with the data lineage information to perform analysis of the combined data in a manner that is not otherwise possible. For example, a change in a schedule of a job may impact data stores beyond those directly affected by the job. Jobs can affect other jobs and each of those jobs can affect data sources. In some scenarios, changes to a data source can, in turn, affect additional jobs. The stored information may be stored in a data storage system 416. The data storage system 416 is also accessible to an analysis system 418 interacting with a user 420. The user 420 is able to perform a drill down analysis of the combined data.

The analysis system 418 and execution environment 404 are, in some implementations, designed using a system for executing computation applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose inter-process communication methods from any available methods (for example, communication paths according to the links of the graph can use TCP/IP or UNIX domain sockets, or use shared memory to pass data between the processes).

The transformation module 406 can receive data from a variety of types of systems that may embody the data source 402, including different forms of database systems. The data may be organized as records having values for respective fields (also called "attributes" or "columns"), including possibly null values. When reading data from a data source, the transformation module 406 typically starts with some initial format information that describes records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

Figure 5:
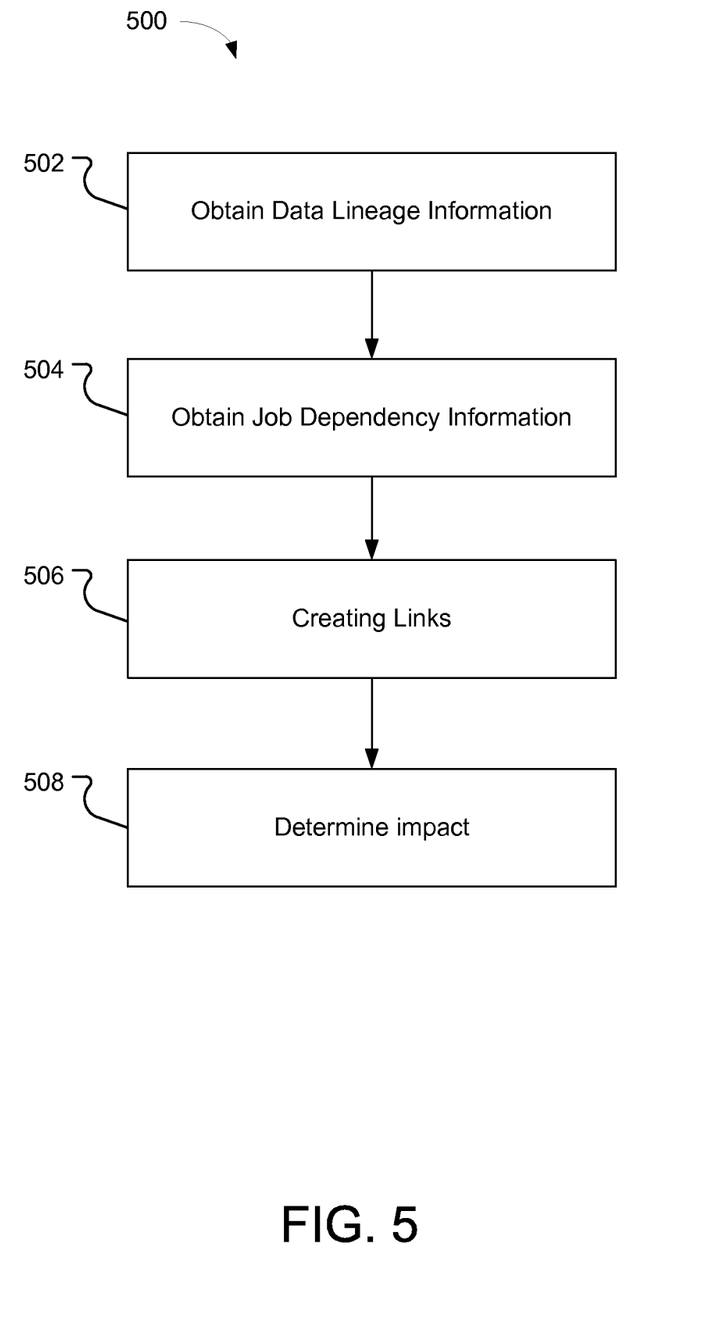
FIG. 5 is a flowchart of an exemplary process for identifying the impact of changes to scheduling information.

FIG. 5 is a flowchart of an exemplary process 500 for identifying the impact of changes to scheduling information. The process may be performed by a computer system performing the process.

Data lineage information can be obtained 502. The data lineage information may be obtained from a data store as described above. The data lineage information can identify dependency relationships between data stores and transformation. The transformation can accept data from one data store and produces data for another data store.

Job dependency information can be obtained 504. The job dependency information can be obtained through the processes discussed above. The job dependency information can specify an order of execution of a plurality of jobs.

Links between at least some of the elements of the job dependency information and the data lineage information can be identified. The links may be direct (for example, the job may cause the transformation to execute 506). The links may also be indirect (for example, the job may cause a dataflow graph to execute, where the dataflow graph includes a transformation). The links may be determined based on the files and data stores that are referenced by the job scheduling information and the data lineage information.

An impact of a change in a planned execution of an application of the plurality of applications on a data store can be determined 508. The impact may be determined based on the job dependency information, the links, and the data lineage information. For example, a user may submit a query that identifies at least one job, an executable program, or a data store. For example, a user may wish to determine the impact if a particular job, executable program, or data source is unavailable or if a particular job fails or fails to execute on time. Alternatively or additionally, a workload automation system may identify that a job has failed or failed to complete on time. A job may fail, for example, when an error occurs during processing that cannot be handled by the job itself. A job may also fail, for example, when a period of time passes.

The process can identify all of the jobs that are dependent on the identified job, executable program, or data store. The process can identify links between the identified job and dependent jobs and data lineage elements. A data lineage element can be a data element that describes a relationship or a portion of a relationship between data sources, data sinks, and data transformations. The data lineage elements that are linked to the identified job and dependent job can be used to determine data lineage elements that are dependent on the job. That is, all of the data lineage elements that are accessed subsequent to the data lineage elements can be identified by the links.

The process can be recursively applied. For example, once the data lineage elements are identified, additional links may relate the data lineage elements back to the additional jobs. The additional job may in turn link back to additional data lineage elements.

Figure 6:
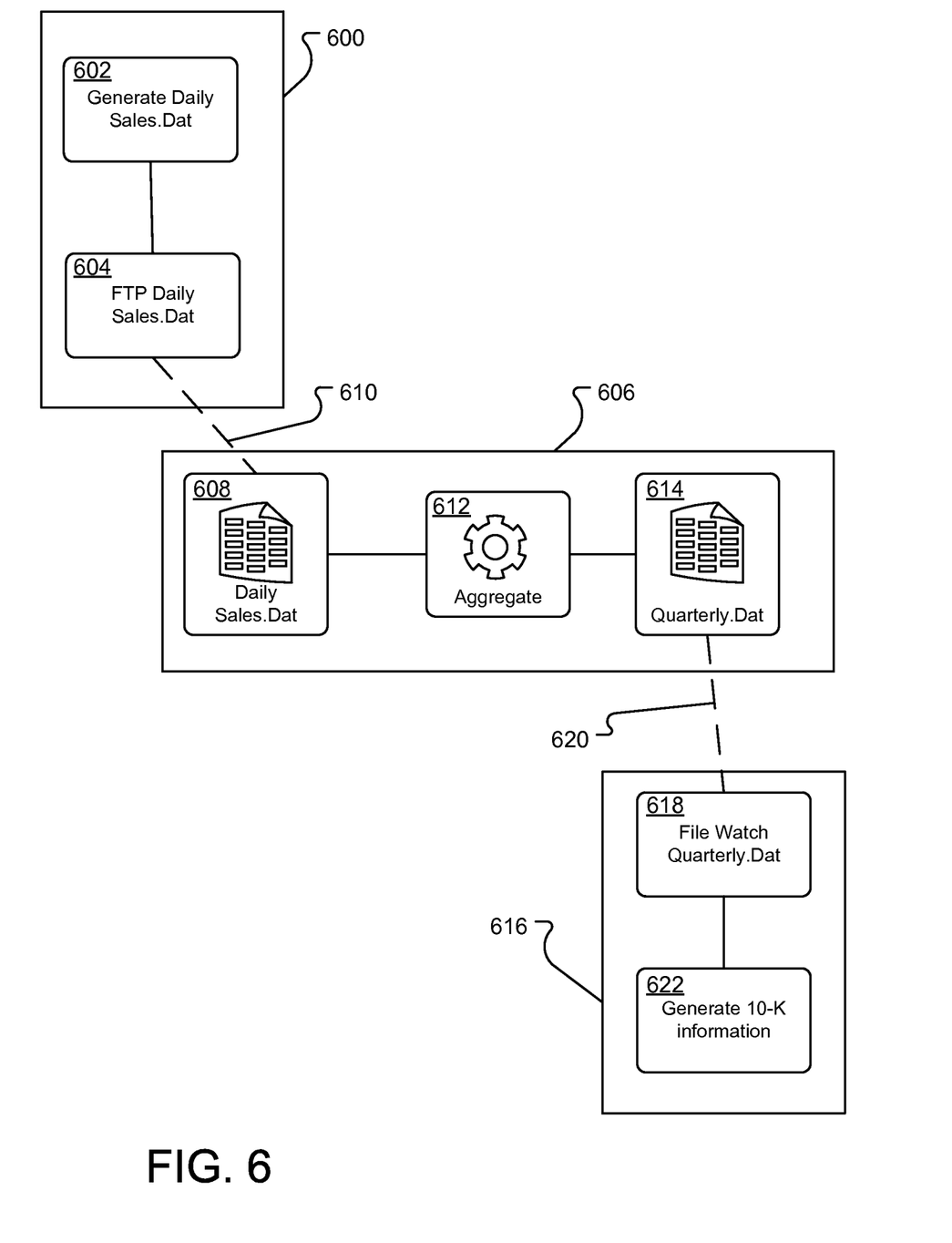
FIG. 6 illustrates an example of interrelated dependency information and data lineage information.

For example, FIG. 6 illustrates a simplified example of dependency information that may be determined based on the combination of job dependency information and data lineage information. A job 600 includes two sub-jobs: (1) a generated daily sales.dat job 602 and (2) a FTP daily sales.dat job 604. The daily sales file.dat is used by a data flow graph 606 as identified by the data lineage information. In this example, the FTP daily dales.dat job is linked to the daily sales.dat data source 608 as illustrated by the dotted line 610. The input file.dat 608 is aggregated with other data, not shown, by the aggregate transform 612. The aggregate transform 612 creates the data source quarterly.dat 614. Another job 616 includes a file watch quarterly.dat job 618 that watches for the creation of the quarterly.dat file. Based on this relationship, the quarterly.dat data source and the file watch quarterly.dat job 618 are linked in the combined repository, as represented by the dotted line 620. The generate 10-K information job 622 uses the quarterly.dat file to generate 10-K information for the SEC.

By using the combined schedule dependency information and the data lineage information and linking back to additional schedule dependency information, the system can determine that a problem generating the daily sales.dat file can result in a delay with generating the 10-K, even though the generate daily sales job and the generate 10-K information job are not linked by the job dependency information.

The data integration and analysis approach described above can be implemented using a computing system executing suitable software. For example, the software may include procedures in one or more computer programs that execute on one or more programmed or programmable computing systems (which may be of various architectures, such as distributed, client/server, or grid), each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessor or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computer implemented method including:
   obtaining, by a computer system, job dependency information that is indicative of an order of execution of a plurality of jobs, with at least some of the jobs including a reference to a first set of data store and data transform elements;
   wherein obtaining the job dependency information includes:
      obtaining scheduling information from a work load repository associated with a workload automation system; and
      identifying first data lineage information that identifies at least one dependency relationship between the first set of data store and/or data transform elements referenced by the at least some of the jobs and a second set of one or more data store and data transform elements, from the work load repository;
   producing, by the computer system, one or more first links between jobs in the plurality of jobs, and one or more second links between the job dependency information that is indicative of the order of execution of the plurality of jobs and one or more identified elements of the first data lineage information;
   receiving, by the computer system, a query that identifies a given job and a change to a planned execution of the given job; and
   for the change in the planned execution of the given job:
      identifying, for the given job, one or more of the one or more produced first links that are between the given job and one or more remaining ones of the plurality of jobs and one or more of the one or more produced second links that are between the job dependency information that is indicative of the order of execution of the plurality of jobs and an identified element of the first data lineage information that is referenced by the job dependency information; and
      executing, by the computer system, an analysis of the identified links, the job dependency information and the first data lineage information to determine an impact of the change in the planned execution of the given job, and wherein determining the impact further includes:
         identifying one or more further links between (i) additional scheduling information associated with one or more jobs or second data lineage information, and (ii) third data lineage information associated with one or more elements that are impacted by the given job; and
         identifying the impact further based on the one or more further links.

2. The method of claim 1, wherein obtaining the job dependency information further includes:
   transforming the scheduling information; and
   storing the scheduling information in a data store that stores the first data lineage information.

3. The method of claim 1, wherein producing the one or more second links includes identifying data sources referenced by the first data lineage information and the job dependency information.

4. The method of claim 3, wherein identifying the data sources includes identifying a data source referenced by the same name in the first data lineage information and the job dependency information.

5. The method of claim 3, wherein identifying the data sources includes identifying a data source using a uniform resource locator.

6. The method of claim 3, wherein identifying the data sources includes identifying a relational database table using a database, table space, and a table name.

7. The method of claim 1, wherein producing the one or more second links includes identifying executable programs referenced by the job dependency information and the first data lineage information.

8. The method of claim 7, wherein identifying the executable programs includes identifying an executable program based at least in part on parameters provided to the executable program.

9. The method of claim 7, wherein identifying the executable programs includes identifying an executable program based on the location of the executable program on a persistent data store.

10. The method of claim 1, wherein determining the impact includes:
   identifying a link between the scheduling information and the first data lineage information; and
   identifying the impact further based on the scheduling information.

11. The computer implemented method of claim 1, wherein the first data lineage information is obtained prior to creating the one or more first links and the one or more second links.

12. The computer implemented method of claim 1, wherein determining the impact comprises determining an impact of the change in the planned execution of the given job of the plurality of jobs on data represented in the first data lineage information.

13. The computer-implemented method of claim 1, wherein an element references an executable or a data store.

14. A non-transitory computer storage medium encoded with computer program instructions that when executed by one or more computers cause the one or more computers to perform operations comprising:
   obtaining job dependency information that is indicative of an order of execution of a plurality of jobs, with at least some of the jobs including a reference to a first set of data store and data transform elements;
   wherein obtaining the job dependency information includes:
      obtaining scheduling information from a work load repository associated with a workload automation system; and
      identifying first data lineage information that identifies at least one dependency relationship between the first set of data store and data transform elements referenced by the at least some of the jobs and a second set of one or more data store and data transform elements, from the work load repository;
   producing one or more first links between jobs in the plurality of jobs, and one or more second links between the job dependency information that is indicative of the order of execution of the plurality of jobs and one or more identified elements of the first data lineage information;
   receiving a query that identifies a given job and a change to a planned execution of the given job; and
   for the change in the planned execution of the given job:
      identifying, for the given job, one or more of the one or more produced first links that are between the given job and one or more remaining ones of the plurality of jobs and one or more of the one or more produced second links that are between the job dependency information that is indicative of the order of execution of the plurality of jobs and an identified element of the first data lineage information that is referenced by the job dependency information; and
      executing an analysis of the identified links, the job dependency information and the first data lineage information to determine an impact of the change in the planned execution of the given job, and wherein determining the impact further includes:
         identifying one or more further links between (i) additional scheduling information associated with one or more jobs or second data lineage information, and (ii) third data lineage information associated with one or more elements that are impacted by the given job; and
         identifying the impact further based on the one or more further links.

15. The medium of claim 14, wherein obtaining the job dependency information further includes:
   transforming the scheduling information; and
   storing the scheduling information in a data store that stores the first data lineage information.

16. The medium of claim 14, wherein producing the one or more second links includes identifying data sources referenced by the first data lineage information and the job dependency information.

17. The medium of claim 16, wherein identifying the data sources includes identifying a data source referenced by the same name in the first data lineage information and the job dependency information.

18. The medium of claim 16, wherein identifying the data sources includes identifying a data source using a uniform resource locator.

19. The medium of claim 16, wherein identifying the data sources includes identifying a relational database table using a database, table space, and a table name.

20. The medium of claim 14, wherein producing the one or more second links includes identifying executable programs referenced by the job dependency information and the first data lineage information.

21. The medium of claim 20, wherein identifying the executable programs includes identifying an executable program based at least in part on parameters provided to the executable program.

22. The medium of claim 20, wherein identifying the executable programs includes identifying an executable program based on the location of the executable program on a persistent data store.

23. The medium of claim 14, wherein determining the impact includes:
   identifying a link between the scheduling information and the first data lineage information; and
   identifying the impact further based on the scheduling information.

24. A system comprising:
one or more computers and one or more storage devices storing instructions that are operable, when executed by the one or more computers, to cause the one or more computers to perform operations comprising:
   obtaining job dependency information that is indicative of an order of execution of a plurality of jobs, with at least some of the jobs including a reference to a first set of data store and data transform elements;
   wherein obtaining the job dependency information includes:
      obtaining scheduling information from a work load repository associated with a workload automation system; and
      identifying first data lineage information that identifies at least one dependency relationship between the first set of data store and data transform elements referenced by the at least some of the jobs and a second set of one or more data store and/or data transform elements, from the work load repository;
   producing one or more first links between jobs in the plurality of jobs, and one or more second links between the job dependency information that is indicative of the order of execution of the plurality of jobs and one or more identified elements of the first data lineage information;
   receiving a query that identifies a given job and a change to a planned execution of the given job; and
   for the change in the planned execution of the given job:
      identifying, for the given job, one or more of the one or more produced first links that are between the given job and one or more remaining ones of the plurality of jobs and one or more of the one or more produced second links that are between the job dependency information that is indicative of the order of execution of the plurality of jobs and an identified element of the first data lineage information that is referenced by the job dependency information; and
      executing an analysis of the identified links, the job dependency information and the first data lineage information to determine an impact of the change in the planned execution of the given job, and wherein determining the impact further includes:
         identifying one or more further links between (i) additional scheduling information associated with one or more jobs or second data lineage information, and (ii) third data lineage information associated with one or more elements that are impacted by the given job; and
         identifying the impact further based on the one or more further links.

25. The system of claim 24, wherein obtaining the job dependency information further includes:
   transforming the scheduling information; and
   storing the scheduling information in a data store that stores the first data lineage information.

26. The system of claim 24, wherein producing the one or more second links includes identifying data sources referenced by the first data lineage information and the job dependency information.

27. The system of claim 26, wherein identifying the data sources includes identifying a data source referenced by the same name in the first data lineage information and the job dependency information.

28. The system of claim 26, wherein identifying the data sources includes identifying a data source using a uniform resource locator.

29. The system of claim 26, wherein identifying the data sources includes identifying a relational database table using a database, table space, and a table name.

30. The system of claim 24, wherein producing the one or more second links includes identifying executable programs referenced by the job dependency information and the first data lineage information.

31. The system of claim 30, wherein identifying the executable programs includes identifying an executable program based at least in part on parameters provided to the executable program.

32. The system of claim 30, wherein identifying the executable programs includes identifying an executable program based on the location of the executable program on a persistent data store.

33. The system of claim 24, wherein determining the impact includes:
   identifying a link between the scheduling information and the first data lineage information; and
   identifying the impact further based on the scheduling information.

* * * * *

UNITED STATES PATENT AND TRADEMARK OFFICE
CERTIFICATE OF CORRECTION

PATENT NO. : 10,705,877 B2
APPLICATION NO. : 14/470501
DATED : July 7, 2020
INVENTOR(S) : Harry Michael Wolfson et al.

Page 1 of 1

It is certified that error appears in the above-identified patent and that said Letters Patent is hereby corrected as shown below:

In the Claims

Column 10, Line 25, Claim 1, delete "and/or" and insert -- and --

Column 11, Line 44, Claim 13, delete "computer-implemented" and insert -- computer implemented --

Column 13, Line 20, Claim 24, delete "and/or" and insert -- and --

Signed and Sealed this
Twenty-ninth Day of December, 2020

Andrei Iancu
*Director of the United States Patent and Trademark Office*